Jan. 3, 1961  H. W. SCHAEFER ET AL  2,966,781
REFRIGERATION APPARATUS AND METHODS OF MANUFACTURING THE SAME
Filed March 5, 1956  3 Sheets-Sheet 1
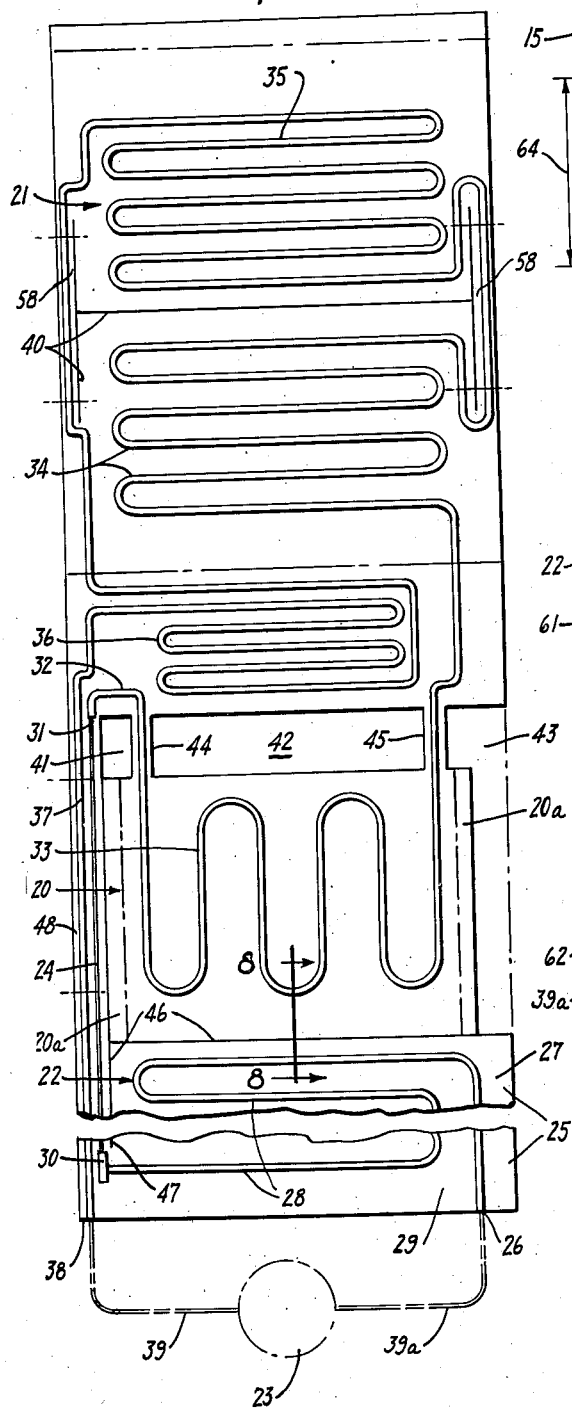
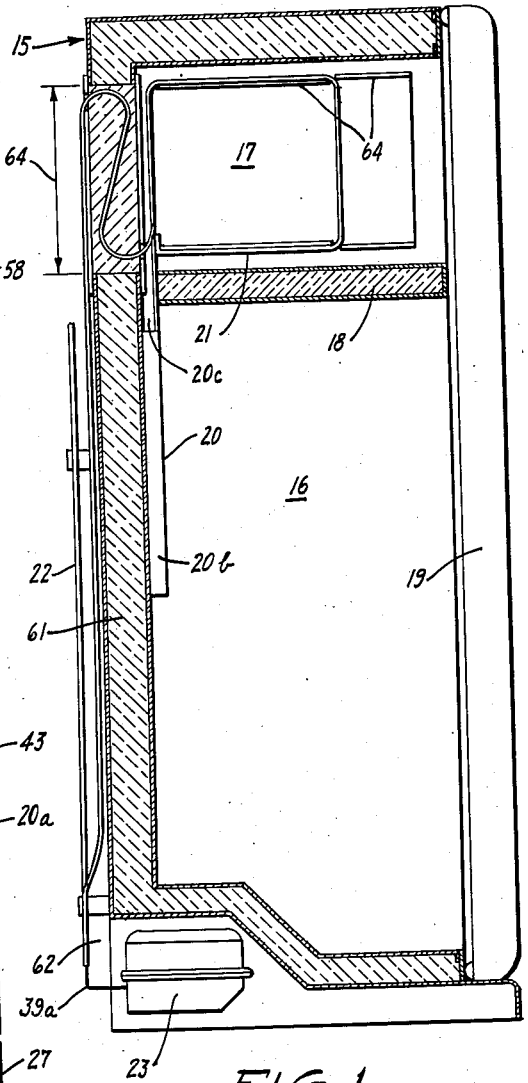
INVENTORS
HAROLD W. SCHAEFER
FRANKLIN W. EDWARDS
BY
Carl H. Synnestvedt
AGENT Jan. 3, 1961  H. W. SCHAEFER ET AL  2,966,781
REFRIGERATION APPARATUS AND METHODS OF MANUFACTURING THE SAME
Filed March 5, 1956  3 Sheets-Sheet 2
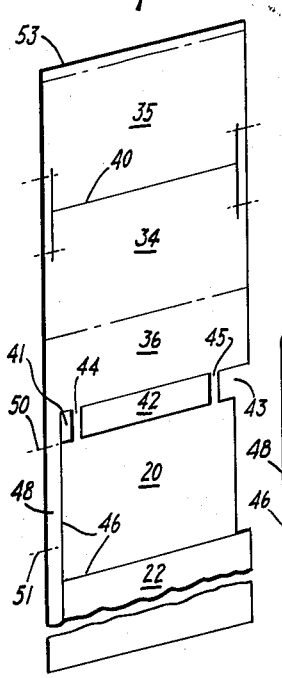
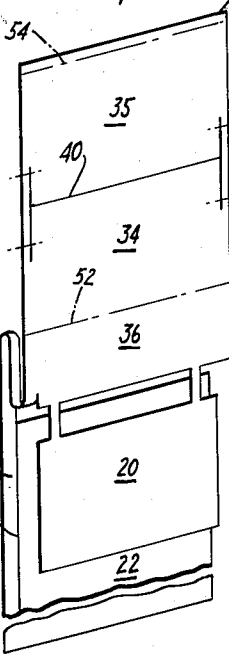
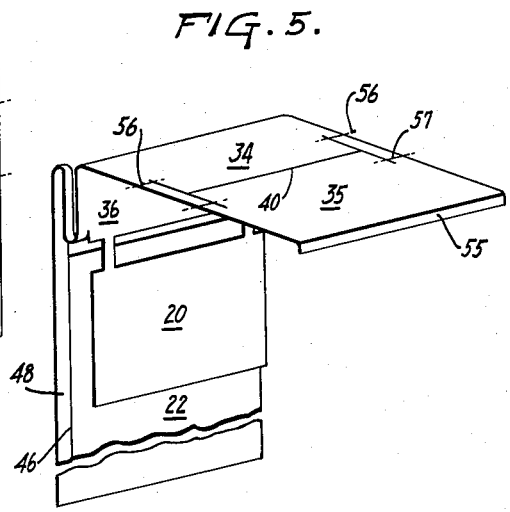
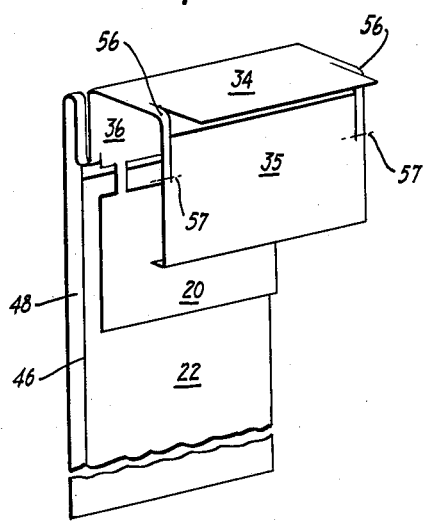
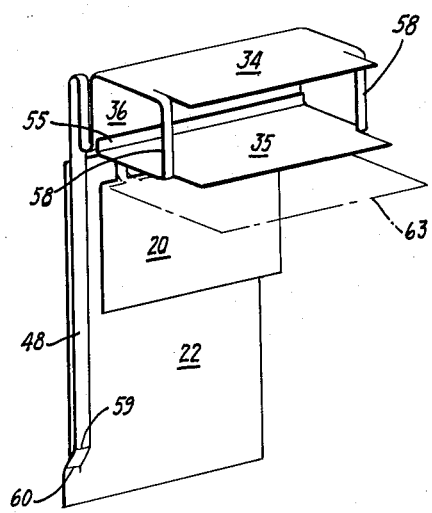
INVENTORS
HAROLD W. SCHAEFER
FRANKLIN W. EDWARDS
BY
Carl H. Lynnestvedt
AGENT Jan. 3, 1961 H. W. SCHAEFER ET AL 2,966,781
REFRIGERATION APPARATUS AND METHODS OF MANUFACTURING THE SAME
Filed March 5, 1956 3 Sheets-Sheet 3

INVENTORS
HAROLD W. SCHAEFER
FRANKLIN W. EDWARDS
BY
Carl H. Synnestvedt
AGENT

United States Patent Office 2,966,781
Patented Jan. 3, 1961

2,966,781

REFRIGERATION APPARATUS AND METHODS OF MANUFACTURING THE SAME

Harold W. Schaefer, Philadelphia, and Franklin W. Edwards, Narberth, Pa., assignors to Philco Corporation, Philadelphia, Pa., a corporation of Pennsylvania Filed Mar. 5, 1956, Ser. No. 569,635

2 Claims. (Cl. 62—523)

The invention hereinafter described has to do with refrigerating apparatus, with methods of manufacturing such apparatus and with an intermediate product of such methods.

At the present time practically every refrigerator is equipped with an assembly of individually fabricated heat exchangers and of individually fabricated tubes or pipes. It is usual to provide series flow between compressor, condenser, restrictor and evaporator means; and often there are also parallel or by-pass circuits or the like, for instance when several evaporators are used to refrigerate several distinct compartments. Numerous conduit fittings are required for interconnecting these various parts in a fluid-tight refrigerant flow circuit.

In the past the components of such systems have been fabricated by various methods. The condensers have almost invariably been made of tubes bent into flat coils or serpentine forms and having heat exchanging fins attached thereto, whereas the interconnecting passages usually have been made of tubing without fins. The evaporators have often been formed, instead, of laminated and desirably roll-forged sheeting, with refrigerant ducts formed in the sheeting and extending between the laminations. It is a well-known advantage of the roll-forged sheeting with conduits therein that the sheeting can simply be bent into the general form of a O or C and that the bent structure then provides most intimate heat exchange between the refrigerant coils and the walls of a box which can be used as a refrigerant evaporator and food storage freezer.

The laminated sheeting with ducts therein is an element of importance for the present invention. It will sometimes be called "printed conduit sheeting" in the discussion which follows. This phrase, and mainly the term "printed," will hereinafter be used in a broad and generalized sense, including a variety of pattern-forming, embossing and other operations; the method of making passages in said forms being capable of performance in very different forms or procedures. For instance, printed conduit sheeting has been made by roll-forging and equivalent methods, wherein the laminating precedes the duct forming, or—less successfully, it is true—by spot welding and similar methods, wherein this basic sequence of operations is reversed; and it may be made by still other procedures. The present invention contemplates certain forms and uses of such sheeting and certain methods of fabricating refrigerating apparatus therefrom. The invention is not primarily concerned with the exact method by which the sheeting is made, although the roll-forging manner of making it is preferred.

It is a primary object of our invention to improve and simplify refrigerating apparatus by new and more comprehensive uses of printed conduit sheeting; and for this purpose we employ certain novel forms of printed conduit sheeting and certain related methods of forming and treating this sheeting.

In the first place we found it greatly preferable not only to bend a unitary, laminated conduit sheet into a C-shape or O-shape, as usual up to now, but to form a sheet of this general type by interrelated, consecutive conduit printing, lancing and folding procedures into a particular three-dimensional shape, for instance a modified C-shape with partly severed heat exchanger panel portions folded out of the general plane of the bent sheet. The partly severed or struck-out, functionally independent heat exchanger panel portions form wings or projections, extending out of the flat or curved planes of the heat exchanger panel portions formed by the more basic bending of the composite sheet; and such different panel portions are advantageously attached one to the other by strip portions of the original, unitary sheeting structure, containing interconnecting refrigerant passages. While the tooling for consecutive conduit printing, lancing and folding may be somewhat more complex than that for mere conduit printing and bending, a significant advantage is achieved thereby, inasmuch as complete refrigerating structures of practically all types can be successfully produced by the new process, while the earlier tooling and process could successfully produce only individual heat exchangers.

In the second place we found it advantageous and in most cases necessary to utilize particular, although basically known forms of conduit printing in conjunction with the fabrication of a comprehensive refrigerator structure consisting of interconnected heat exchanger panels. As already mentioned, we prefer the roll-forging technique, heretofore used only for the fabrication of evaporators; and we found this technique even better adapted to the fabrication of a complete, integral, multiple-plane system of heat exchanger panels and connecting conduit structures.

Thus it is an important object of the invention to provide new and advantageous forms of unitary, printed-conduit sheeting for refrigerator apparatus of the multiple heat exchanger type. More particular objects are: to minimize the number of tubular conduits and of tubular conduit joints and fittings in such apparatus and thereby to reduce leakage trouble, among other things; to provide the benefits of multiple compartment arrangements in economical manner; to insure proper mechanical strength and suitable thermal performance in the various parts of the apparatus; and to economize printed conduit material.

Briefly described in one of its several aspects, the preferred method of the invention starts by forming a composite sheet with heat exchanger and connector passageways therein, and continues with a step of partly severing the composite sheet into a number of panels and other parts. This severing is performed by way of a procedure frequently referred to as "lancing" in the metal working art. A particular, preferred method of lancing the composite metal sheet utilizes a shearing type of die action. The shearing or other lancing is efficiently and economically performed so as to partly divide the original, coherent sheet into panels and strips, incorporating respectively the heat exchangers and some of the connecting passageways and separated only by linear cuts. The method then usually continues with an operation of forwardly and backwardly bending some of the partly severed sheet areas or panels, in order to separate the various, interconnected heat exchangers more widely and to arrange them in a multiple-plane disposition adapted to be fitted to a specific type of refrigerator cabinet. Finally the bonded, lanced and folded sheeting is fitted and secured to outside and inside walls of the cabinet structure.

As briefly noted above we have found that the manufacture of refrigerating apparatus of the present type is facilitated by providing, as a new article, an intermediate product formed by roll-forging or equivalent bonding, prior to the lancing or equivalent severing and the subsequent bending or folding. This intermediate product may consist of substantially coherent, smooth, composite sheeting of the printed conduit type, with the conduits arranged as mentioned above; and it may best be produced in mass, by roll-forging or equivalent surface-bonding in a strip-rolling plant. Thereafter, the final forming and testing steps are best performed individually, after suitable cutting or slitting; and this final work may best be done in a plant equipped for various hydraulic and thermal tests and the like. Between the strip-rolling performed in one plant and the other operations, performed elsewhere, a variety of storing and handling steps are necessary. All of these are greatly facilitated by a substantially coherent and smooth condition of the sheet forming the intermediate product, that is, by the absence of appreciable perforations, corrugations and the like. It is contemplated that sheeting of this kind can be shipped and stored in a flat form, although it is also possible to ship or store it in form of a roll.

The features and advantages of the new structure will become more apparent from consideration of exemplary embodiments which will now be described.

In the drawing:

Figure 1 is a sectional view of a domestic two-compartment refrigerating apparatus constructed in accordance with the present invention;

Figure 2 is a plan view of a surface-bonded and die-cut sheeting structure, forming an intermediate product of manufacture and being adapted to be bent and folded into a certain shape, providing the heat exchanger system utilized in the refrigerator shown in Figure 1;

Figures 3, 4, 5, 6 and 7 are diagrammatic views, showing successive conditions of the sheet illustrated in Figure 2, in successive operations of bending and folding it into said shape;

Figure 9:
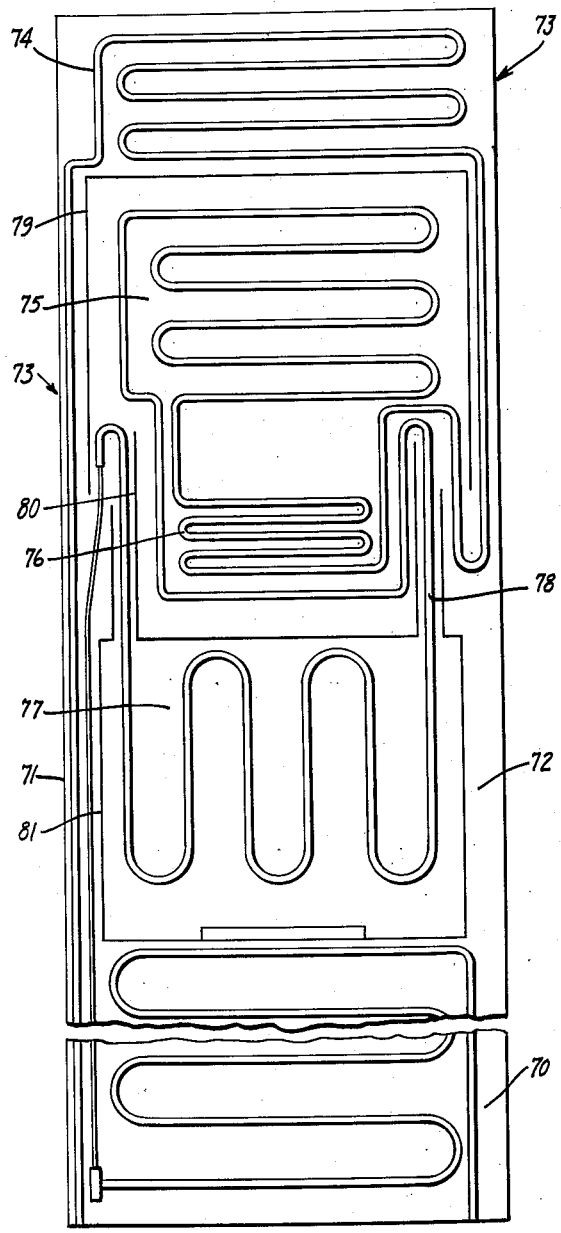
Figure 9 is a view similar to Figure 2 but showing another form of surface-bonded and die-cut sheeting structure for present purposes; and Figue 10 is a diagrammatic view similar to Figure 7 but showing the structure of Figure 9 as it appears when completed.

Referring to Figure 1, the reference numeral 15 designates the refrigerator cabinet in general, while the numerals 16 and 17 designate, respectively, food storage and freezer compartments therein, these compartments being separated by a heat-insulating partition 18. The cabinet is of a well known open-front type with a door 19. The compartments 16 and 17 are refrigerated by evaporators 20 and 21, respectively; and said evaporators are conected in refrigerant flow circuit, particularly in series circuit, with a condenser 22, positioned across the outside of the back wall of the refrigerator; a compressor 23, located beneath the food storage compartment; and a so-called capillary restrictor conduit 24, interconnecting the condenser with the evaporators.

Evaporators 20 and 21, capillary conduit 24, condenser 22 and associated portions of the refrigerant passageway system form a particular and preferred embodiment of the invention now to be described.

As best shown in Figure 2, there is provided a smooth, flat, originally coherent blank 25, incorporating the heat exchangers 20, 21 and 22 and the interconnecting ducts. This blank is formed of a pair of sheets of aluminum or other metal or heat conducting material, desirably by the roll-forging process, and is subsequently cut and adapted to be bent in certain ways. While the present invention does not reside in a roll-forging method as such, a brief general description of this method is here included in order to facilitate a complete understanding of all aspects of the invention. In practicing the roll-forging method, a pair of metal sheets or plates are placed one upon the other, in face-to-face relationship, with a stop-weld material applied in a predetermined pattern to parts of the inner face of one of the plates. The plates are then combined into a single or unitary composite sheet or laminated structure, sheet 25 in the present case, by passing them between a pair of heated pressure rollers, substantially uniformly bonding the contacting plate surfaces together at all points except where the stop-weld material has been applied. The latter material may consist of a water suspension of collodial graphite and sodium silicate, applied as a thin layer. The plates may consist of more or less dissimilar metals, leading to metal-cladding and/or bimetallic effects; or they may be similar or identical. The roll-forging operation greatly reduces the thickness and increases the length of the plates but does not materially widen them; a fact which can be taken into account in laying out and applying the pattern of the stop-weld material.

After the composite sheet has been roll-forged, the potential internal passages, determined by the stop-weld material, are actually formed and dilated by subjecting them to high internal fluid pressure while the plates are confined between suitable dies. The smooth or flat form of the sheeting can be preserved on one side or the other, as may be desired.

In the present application of the roll-forging method, the refrigerant flow passages forming the freezer evaporator 21 are arranged to form an area having the general form of a rectangle, substantially filling one end of the laminated, rectangular sheet 25; the passages forming the condenser 22 are similarly arranged, substantially filling the other end of said sheet; and the passages forming the refrigerating evaporator 20 are similarly disposed, substantially filling an intermediate portion of said sheet. Figure 2 is on a scale making it necessary to break away a part of the condenser panel portion 22, and, therefore, only the top and bottom of the refrigerant flow passages of this portion are shown.

Figure 8:
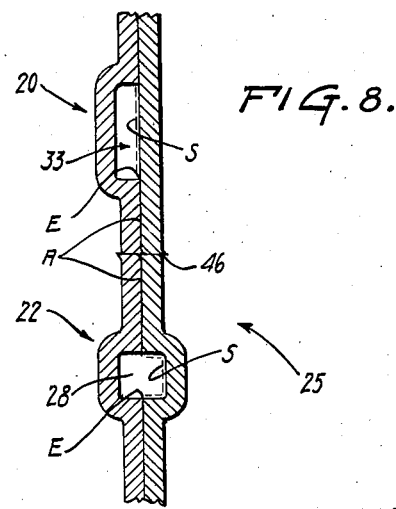
Figure 8 is a sectional detail view, taken along line 8—8 of Figure 2.

In trnsverse section as well as in the surface arrangement just mentioned, the passageways according to the present invention may have somewhat peculiar forms, partly dictated by characteristics of the roll-bonding process. Referring to Figure 8, the passageways of the food storage evaporator plate 20 may have flat, defrost-promoting walls at the front, shown at the right hand, whereas the passageways of the condenser plate 22 may be raised both in front and back of the sheet. The sheet areas A in surface contact with one another are bonded together by a strong bond, desirably uniform over the bonded area and ending sharply at the edges E of the unbonded or passage areas. For producing such bonding features the known technique of first raising the passages and then welding along their edges is believed to be less desirable, because it leads to unpredictable forms of passages, mainly at the turns of the passages but also along their straight parts, due to the uncontrollable behavior of flows of welding heat, weld shrinkage and related effects. For the flow passages of a refrigerant flow system, smooth and accurate forming of the interconnecting passages is highly desirable, as is well known to persons skilled in the art.

Various patterns of suitably raised refrigerant passages may be formed in the sheet 25, but the present embodiment has the inlet 26 of the condenser passage at the lower right hand corner, wherefrom the passage runs upwardly along the right hand edge of the sheet to the top 27 of the condenser panel, then in a descending serpentine path 28 between the edges of the sheet, and then along the bottom edge 29 of the condenser panel; there it connects, as at 30, with a passageway of small diameter forming the so-called capillary passageway 24, which extends upwardly in a left hand edge area of the sheet. The capillary passage is connected at its upper extremity 31 with the inlet passage 32 of the refrigerating evaporator panel 20. The latter portion of the flow circuit extends in a laterally coursing, serpentine path, as indicated at 33, across the evaporator, toward the right hand side of the sheet, from which it passes upwardly to provide the area of the freezer evaporator 21. The passages of the latter evaporator follow in series, being sub-divided into three serially connected groups 34, 35 and 36, so located that upon suitable forming of the sheet they form the top, bottom and rear wall portions, respectively, of a freezer evaporator compartment 21, as more fully described hereinafter. From group 36 the passageway runs downwardly as indicated at 37, along the left hand edge of the sheet, adjacent to but separate from the capillary passage 24. Thus it reaches the bottom edge 29 of the sheet, where it is connected, as at 38, to one end of a separate suction tube 39, the other end of which is connected to the inlet of the compressor 23; the outlet of the latter being connected to the inlet 26 of the condenser by a separate discharge tube 39a.

The sheet 25 comprises the aforementioned panels and certain auxiliary strips; and these portions are partly separated from one another to permit bending and forming of the various portions of a unitary heat exchange structure, adapted, without tubular conduits and fittings forming part thereof, to serve as operating equipment in and for the refrigerator cabinet of Figure 1. With greater particularity, an H-shaped cut 40 is made, with vertical lines parallel to the vertical edges of the sheet 25. This cut partly separates top and bottom panels 34 and 35 of the freezer evaporator 21 from one another and from lateral strips interconnecting such panels, in preparation for the subsequent striking out and folding out-of-plane of these portions. Further, a series of laterally aligned apertures 41, 42, 43 are cut out of the sheet 25 and the sheet material thereof is bodily removed, leaving however narrow strips 44, 45 of the sheet material, between these cut-outs. This arrangement provides spatial separation, as well as the possibility of inserting thermal insulation, between the freezer evaporator panels above these apertures and the refrigerator evaporator wall 20 below these apertures. Refrigerant passages to and from the latter evaporator extend along the connecting strips 44, 45. Still further, a T-shaped cut or slit 46 is made, in overturned orientation, with a leg between the condenser and the system of evaporators and with the cross-stroke between the capillary passage 24 and the entire extension of the refrigerating evaporator and condenser portions 20 and 22. The slit forming this cross-stroke extends downwardly from the cut-out 41 to a point 47 just above and to the right of the connection 30 between the condenser and capillary passages. In this manner a long, narrow strip 48 is formed, along a lower left hand edge portion of the sheet 25. The T-shaped cut 46 serves to thermally separate the refrigerating evaporator, the condenser and the capillary strip from one another, while placing the capillary passage in desirable heat exchange relationship with the suction passage 37.

Now with reference to Figures 3 through 7, one method of folding the sheet 25 from its flat and slitted condition into its ultimate shape will be described, it being understood, of course, that, within the broader aspect of the invention, a different sequence of steps may be followed if desired. It will further be understood that the present figures show the composite sheet without its refrigerant flow passages, in order to simplify the representation of the successive folded conditions of the sheet. In all other respects, excepting scale, Figure 3 is identical with Figure 2 and is only included in the present series of figures in order to facilitate comparison with the condition of Figure 4, which shows the sheet at the completion of the first folding operation or succession of bending steps. A top portion of the capillary and conduit strip 48 has here been folded forwardly into an S-shape, about a pair of bend lines 50 and 51 shown in Figure 3, bodily displacing sheet portions severed by the leg and the upper arm of the overturned T-cut 46, and thus spacing the condenser 22 to the rear of all evaporator portions. As indicated by Figure 5, the next bend takes place about line 52 shown in Figure 4, between freezer evaporator portions 34, 36; it places the top and bottom portions 34, 35 of the evaporator in a horizontal plane, while the back portion 36 of this evaporator remains in its previously established vertical position. Simultaneously with this step the top edge 53 of the freezer evaporator, shown in Figure 3, may be bent about bend lines 54, shown in Figure 4, thus to form a narrow flange 55 in this region, as indicated in Figure 5; the purpose of this flange being explained hereinafter. Next, as indicated by Figures 6 and 7, freezer bottom portion 35 is bent first downwardly and then backwardly about parallel bend lines 56, 57 shown in Figure 5 and extending across narrow strips of the sheeting material on the outside of the H-shaped line cut 40, thereby bodily displacing sheet portions severed by the H-cut 40 and placing the freezer bottom portion 35 in a horizontal position, spaced from but parallel with the freezer top portion 34 and connected thereto by narrow holder and connector strips 58 in front of the structure. The aforementioned flange 55 now rests against back wall 36 of the freezer evaporator, where it may be secured by welding or other suitable means or steps. Figure 7 also shows the complete condenser panel 22 and shows it spaced farther to the rear, by bodily displacing sheet portions severed by the lower arm of T-cut 46 and bending the lower portion of the aforementioned strip 48 about bend lines 59 and 60. This last step allows spacing the condenser from the rear wall 61 of the refrigerator, as seen in Figure 1, while leaving the narrow strip 48 adjacent to and supported by said wall. An air flow channel 62 is thus provided between the condenser and the rear wall of the cabinet, while the narrow strip containing the capillary and suction passages can be secured to said rear wall in direct contact therewith.

In the upper and forward parts of the structure, it is possible to temporarily bend the refrigerating evaporator panel 20 into a horizontal position 63, indicated by broken line lies in Figure 7, in order to facilitate assembling of the sheet structure withn the refrigerator cabinet 15 (Figure 1). In this horizontal position of the refrigerating evaporator, both evaporators may easily slip through a relatively narrow back wall opening provided in the cabinet, which is indicated by the dimension numeral 64 in Figure 1. Thereafter the refrigerating evaporator 20 (Figure 7) may be returned to its vertical position, for instance by turning it about the ends of the strips attaching it to the overlying element 36, such turning being effected prior to installation of partition 18 (Figure 1). Said refrigerating evaporator 20 is then separated from the condenser by a gap which is occupied by the rear wall 61 of the cabinet. Another characteristic feature of the evaporator section of the present structure pertains to the opposite vertical edge portions of the refrigerator evaporator 20: these, like other parts of the structure, may be integral with the sheets and may be bent about vertical lines 20a (Figure 2), thus to provide flanges 20b (Figure 1), spacing this evaporator panel from the rear wall of the cabinet when the panel has been finally bent into the proper vertical plane, so that it may form an air flow channel 20c between the back wall of the cabinet and a so-called "true-zone" plate provided by the evaporator 20. This arrangement facilitates maintenance of stable, independent refrigerating temperatures and effective performance of defrosting operations, aside from other related objectives, all of which are more fully considered in Patent No. 2,706,894 of Malcolm G. Shoemaker, assigned to the assignee of the present invention. Referring further to the freezer evaporator: as shown in Figure 1, this unit may have metallic side walls 64, marginally secured and bonded to the panels and strips provided by the formed sheet 25, in order to transfer heat from the sides as well as the top, the bottom and the back of this chest. For similar purposes there may be provided a separate front door for this unit, not shown. Pursuant to the above described insertion of the evaporator structure, the bending of portions thereof, and the installation of partition 18, said evaporator structure is supported in any convenient manner as by the use of grommets, or screws, not shown, extending between the evaporator structure and either the top of the cabinet or the surface of partition 18.

Referring finally once more to the capillary passage 24 this duct may be provided in a number of different ways but it is preferred to form it integrally with the sheet 25 to insure the most efficient heat exchange of this passage with the suction passage. Such integral forming of the capillary may be performed in accordance with the method shown and described in the copending application of Maurice Goff, bearing Serial No. 573,536, filed on March 23, 1956, and assigned to the assignee of the present invention.

It will be understood, of course, that the compartment and panel arrangement described above is merely exemplary and that others might be employed. For instance, the position of the compartments 16 and 17 could be reversed, placing the freezing compartment 17 at the bottom of the cabinet and the food storage compartment 16 at the top. Such reversal can be carired out by simply placing the above described apparatus in an upside-down position, or by modifying the same in various manners, for instance, leaving the compressor in the bottom position shown and suitably modifying the arrangement of the conenctor strips 44, 45, 48, 58, etc.

Figure 10:
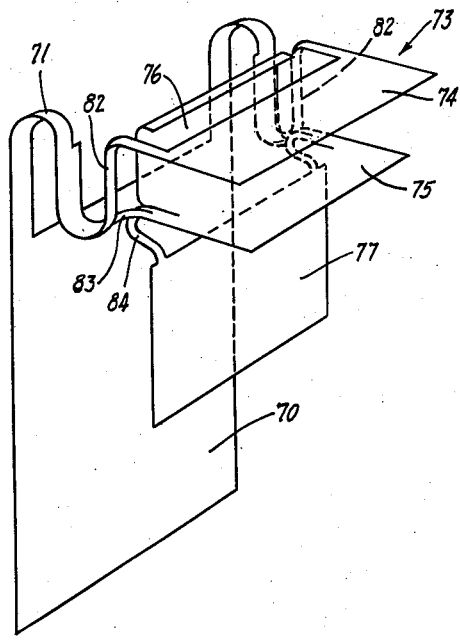

A further modification is illustrated in Figures 9 and 10. In this form the condenser, designated by the numeral 70, is connected to the evaporators by a pair of strips 71 and 72, interconnecting these parts at opposite sides of the composite sheet, with refrigerant flow passage means in either or both strips 71, 72. This arrangement provides greater strength and, at the same time, more complete utilization of the roll-forged, lanced and folded structure. The added, structural stability, in turn, is useful in the final assembly operations. These advantages, as mentioned, are accompanied by enhanced economy, that is, by complete elimination of any waste of roll-forged sheet material. Of course, an important feature of economy, in this latter respect, is provided by both embodiments, inasmuch as in each case a coherent, flat sheet metal blank is practically fully converted into the much shorter, three-dimensional refrigerator structure. Only a minor portion of printed conduit sheet metal in the ultimate product is used for relatively secondary purposes. This applies mainly to the S-shaped, upper part of the s trip 48, which is required mainly in order to lower the top edge of the true-zone plate 20 to or below a zone in front of the top of the condenser; and in the embodiment of Figures 9, 10, a pair of strips 71 are utilized in this manner.

The upper or freezer evaporator 73 of the modified structure again comprises three groups or panels of passageways, identified by the numerals 74, 75 and 76 and representing the top, bottom and back portions respectively of this evaporator. The slitting and folding of these portions may differ from that shown in Figures 3 through 7, as will be explained presently. It may first be noted that here the refrigerator flow in the top evaporator 73 is somewhat different from that shown in Figure 2. The flow in question, in the present device, passes upwardly and then downwardly through a passage 78 coming from the plate evaporator 77; it then passes around refrigerant flow passages of a relatively narrow portion 76, forming the lowest part of the top evaporator panel as incorporated in the original, unfolded lay-out of the composite sheet; thence upwardly to a relatively wider portion 75 of the top evaporator, forming the middle portion thereof in said original lay-out; thence downwardly again to said portion 76 and through serpentine windings thereof; then upwardly again to the third and last portion 74; and then finally downwardly along the left side edge of the sheet to the bottom, where it may be connected to the suction conduit of a compressor in the same manner as shown in Figure 2.

The sheet containing these evaporator passageways is partly severed into interconnected panels and strips by a system of three substantially U-shaped slits, identified by the numerals 79, 80 and 81, which are so arranged and correlated with the passageways that the aforementioned panels 74, 75, 76 form respectively the top, bottom and back walls of a freezer chest; top portion 74 being connected to the lower portions of the structure by a pair of outermost branches 82 of the strips 71; the bottom 75 being connected to the strips 82 by a pair of inner branches 83 thereof; the plate evaporator 77 being connected to the branches 83 by a pair of innermost lower branches 84; and the freezer evaporator back panel 76 being connected to the bottom panel 75 by upward bending along the remaining width of these panels.

The examples described are believed to be sufficient to show that the invention is adaptable for use in a great variety of differently designed cabinets by re-arrangements of interconnecting refrigerant flow passages and associated lancing or partly severing slits, and by further modifications of the bending patterns impressed on the sheet. It is, however, preferred to orient the bending lines so that there is formed an E-shaped structure, as best shown in Figure 1, wherein the superposed horizontal arms are formed by upper evaporator panels and by the compressor structure, said arms extending forwardly from a vertical panel structure principally formed by the condenser. The food storage evaporator and/or other parts can be struck out of the basic, curved plane defined by the uppermost and lowermost arms and the vertical back.

In addition to this flexibility of design—hitherto attained only at the cost of incorporating and servicing numerous variants of tubular connectors and fittings—the invention offers the great advantage that the entire, complex heat exchange structure is incorporated in an article of sheeting which can be preformed and pretested by mass-production techniques. Successful mass-production is safeguarded by producing the unitary comprehensive sheet by a uniformly surface-bonding process, such as the roll-forging hitherto applied to mere evaporator chests, wherein a sharply outlined, properly designed pattern of passageways is formed. The flat, bonded sheets 25 can be stored and handled with great ease, rapidity and safety, particularly during the lancing operations. Finally, while a succession of sheet-bending and panel-displacing operations must be performed for assembling the sheet structure with the cabinet, even these final assembly operations are simplified by the fact that only a single, unitary sheet structure needs to be handled, by contrast with the assembly of tubes, fins, holders, fittings and the like, making up the prior forms of refrigerating apparatus. Practically no waste of composite sheet material is involved by virtue of the folding and panel displacing procedures described herein.

While only two embodiments of the invention have been illustrated and explained, it should be understood that the details thereof are not to be construed as limitative of the invention, except insofar as set forth in the following claims.

We claim:

1. An integral heat exchanger sheet, with passages extending therein and bounded by solid sheet material to form a refrigerant circuit, said sheet comprising at least one pair of sheet and circuit portions, wherein the sheet portions are severed from one another by an elongate slit penetrating the sheet and longitudinally extending adjacent passages which extend in the sheet, said slit being substantially linear as seen in a plan view of the sheet; at least one of said sheet portions being an elongate strip with at least one of the passages longitudinally extending therein, the strip and passage being integrally connected, in end portions thereof, to other portions of the sheet and passages, respectively, and the strip being bent out of the plane of the adjacent sheet portion in such a way that the slit therebetween forms a gap which, in a side view of the sheet, is sufficiently wide to enable the strip and the adjacent sheet portion, with their respective passages, to function as independent heat exchanger portions of said refrigerant circuit.

2. A heat exchanger sheet as described in claim 1 wherein said elongate strip has two of the passages longitudinally extending therein, one of the so extending passages being of appreciably smaller cross section than the other to provide a capillary passage.

References Cited in the file of this patent

UNITED STATES PATENTS

| | | |
|---|---|---|
| 2,201,316 | McGee | May 21, 1940 |
| 2,231,162 | Hintze | Feb. 11, 1941 |
| 2,243,903 | Hintze | June 3, 1941 |
| 2,295,113 | Jordan et al. | Sept. 8, 1942 |
| 2,410,360 | Philipp | Oct. 29, 1946 |
| 2,583,682 | Celovsky | Jan. 29, 1952 |
| 2,619,811 | Philipp | Dec. 2, 1952 |
| 2,660,971 | Hutt-Brenning | Dec. 1, 1953 |
| 2,712,736 | Wurtz et al. | July 12, 1955 |
| 2,728,316 | Oberg et al. | Dec. 27, 1955 |
| 2,740,188 | Simmons | Apr. 3, 1956 |
| 2,747,258 | Kramer | May 29, 1956 |
| 2,760,346 | Grenell et al. | Aug. 28, 1956 |
| 2,779,168 | Jacobs et al. | Jan. 29, 1957 |
| 2,795,113 | Wurtz | June 11, 1957 |

UNITED STATES PATENT OFFICE
CERTIFICATION OF CORRECTION

Patent No. 2,966,781                                      January 3, 1961

Harold W. Schaefer et al.

It is hereby certified that error appears in the above numbered patent requiring correction and that the said Letters Patent should read as corrected below.

Column 3, line 62, for "refrigreant" read -- refrigerant --; column 4, line 41, for "trnsverse" read -- transverse --; column 6, lines 44 and 45, for "brok-line lies" read -- broken lines --; line 46, for "withn" read -- within --; column 7, line 31, for "carired" read -- carried --; line 36, for "conenctor" read -- connector --; line 58, for "s trip" read -- strip --.

Signed and sealed this 30th day of May 1961.

(SEAL)
Attest:

ERNEST W. SWIDER
Attesting Officer

DAVID L. LADD
Commissioner of Patents